Figure 1:
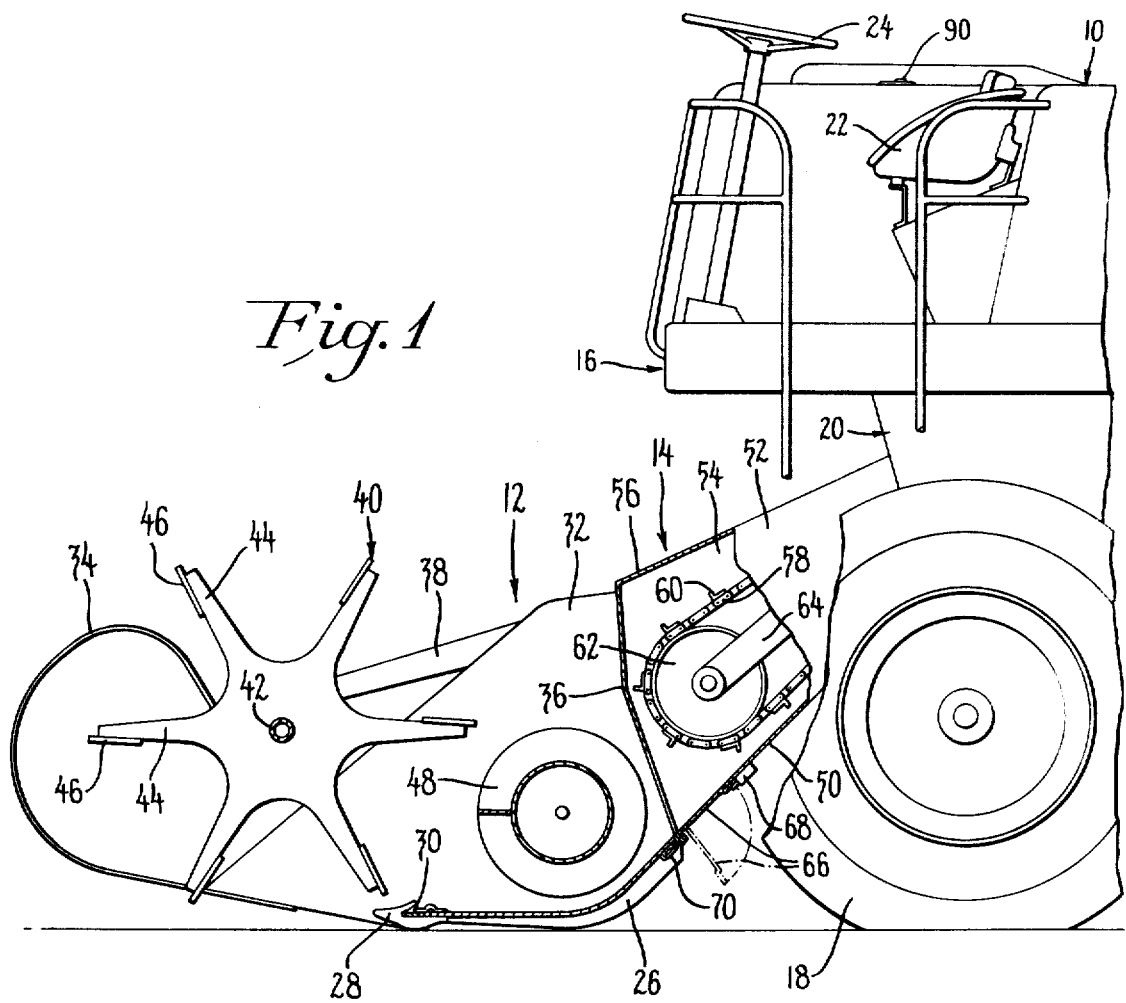

United States Patent
Girodat

[15] 3,675,660
[45] July 11, 1972

[54] COMBINE STONE TRAP DOOR

[72] Inventor: Joseph C. F. Girodat, Mississauga, Ontario, Canada

[73] Assignee: Massey-Ferguson Industries Limited, Toronto, Ontario, Canada

[22] Filed: May 3, 1971

[21] Appl. No.: 139,428

[52] U.S. Cl. .......................... 130/27 JT, 56/DIG. 15, 209/74
[51] Int. Cl. ......................................................... A01f 12/10
[58] Field of Search ............... 340/267; 310/15; 209/74, 75, 209/115; 130/27 R, 27 J, 27 JT; 56/10.2, DIG. 5; 171/14, 18

[56] References Cited

UNITED STATES PATENTS

| | | | |
|---|---|---|---|
| 2,305,159 | 12/1942 | Heckman et al. | 130/27 JT |
| 3,073,099 | 1/1963 | Andersen | 56/10.2 |
| 3,435,950 | 4/1969 | Suverkrop | 209/75 |
| 3,552,396 | 1/1971 | Gerhardt | 130/27 J |

*Primary Examiner*—Antonio F. Guida
*Attorney*—Gerhardt, Greenlee & Farris

[57] ABSTRACT

A stone trap door, in the path of feed of crop material, in a combine harvester is held in a closed position by a latch control by a solenoid. The solenoid is energized to open the stone trap door by an electronic rock detection circuit. The rock detection circuit includes a piezolectric ceramic disc attached to the bottom of the table to detect vibrations induced in the bottom of the table by material conveyed along the bottom of the table toward the trap door. The piezolectric ceramic disc produces an output signal which varies in frequency and amplitude depending upon the frequency and amplitude of the vibrations induced in the bottom of the table. The output signal passes through a band pass amplifier and a peak detector which filter out all the output signals except those produced by rocks or other hard objects. The signal produced by rocks or other hard objects is then amplified to energize the solenoid and open the stone trap door.

4 Claims, 2 Drawing Figures

PATENTED JUL 11 1972 3,675,660

INVENTOR.
JOSEPH C. F. GIRODAT
BY
Gerhardt, Greenlee & Farris
ATTORNEYS.

COMBINE STONE TRAP DOOR

This invention relates to a combine harvester thresher and more specifically to a rock trap for removing rocks from the machine to prevent damage.

Rock traps are old and well-known in the art. One type which is commonly used includes a recessed area in front of the cylinder. When a rock strikes the cylinder it is forced into the recessed area if the recessed area is not already full of rocks. The operator has to remember to empty the recessed area periodically to insure that it does not become filled with rocks. Quite often a rock will extensively damage or even stop the elevator to the cylinder before it reaches the recessed area. If the elevator to the cylinder conveys a rock to the cylinder some damage will usually occur to at least some of the cylinder bars before the rock is forced into the recessed area.

Another type of rock trap commonly used on combine harvester threshers incorporates a trap door and an overload release latch. The trap door is preferably the forward portion of the concave under the cylinder. When a rock enters the cylinder the overload release latch releases the trap door and allows the rock to fall on the ground. This type rock trap has several limitations. The conveying mechanisms in front of the cylinder may be damaged, the cylinder bars contact the rock and apply pressure on the trap door resulting in possible damage to the cylinder bars, and the trap door is often difficult to close due to its location and the overload release latch.

The rock trap of this invention for a combine harvester thresher includes a door in the path of feed of crop material. An electronic detection device detects the presence of rocks mixed with crop material and actuates a latch to open the door and let the rocks fall out of the machine.

The electronic rock detection device employs a piezoelectric ceramic disc attached to the table bottom for detecting the presence of rocks with the crop material conveyed along the bottom of the table.

Figure 2:
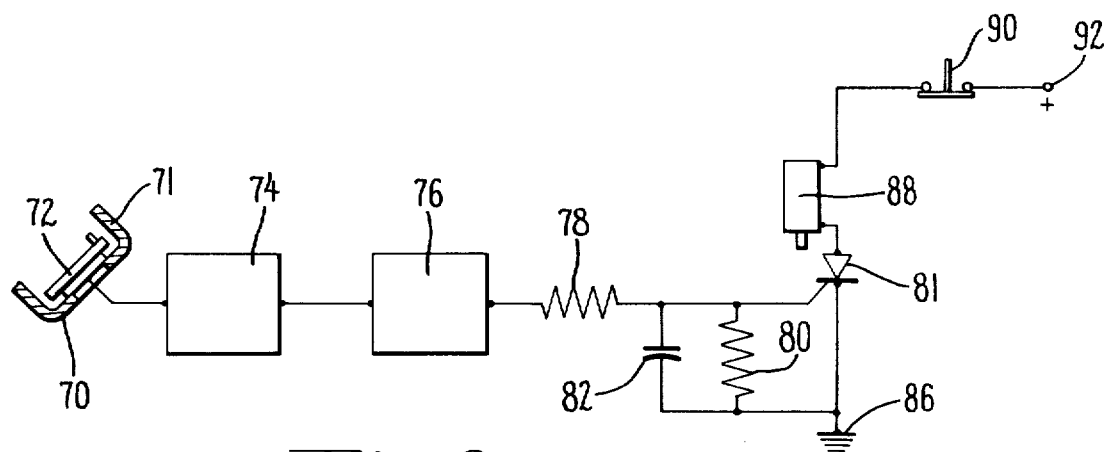

In the drawing:

FIG. 1 is a partially broken away side elevation of the forward portion of a combine harvester thresher showing the rock trap of this invention; and FIG. 2 is a schematic circuit diagram illustrating the electrical circuitry of the rock detector of this invention.

The combine harvester thresher employing the rock trap of this invention includes a table 12, an elevator 14 to the cylinder, an operator's platform 16, wheels 18, only one of which is shown, to support and propel the combine, and conventional threshing and cleaning assemblies 20. The operator's platform 16 includes a seat 22, a steering wheel 24, and the necessary control means to control the operation of the combine. The rear portion of the elevator 14 is pivotally attached to the front portion of the combine 10 with the conventional threshing and cleaning assemblies 20. The table 20 is attached to the forward end of the elevator 14.

The table 12 includes a table bottom assembly 26. A plurality of guards 28 are attached to the forward edge of the table bottom assembly 26. A reciprocable knife 30 is supported by the guards 28. A plurality of knife clips hold the reciprocable knife 30 in its proper position on the guards. A divider 32 and a divider guard 34 are mounted on each end of the table bottom assembly 26. A table back plate 36 extends up from the table bottom assembly and from one divider to the other and is connected to the elevator 14. A reel support arm 38 is mounted on each end of the table 12. A reel 40, including a reel shaft 42, a plurality of spiders 44 connected to the reel shaft, and a plurality of reel bats 46 connected to the arms of the spiders 44, is rotatably supported by the reel support arms 38 to gather and hold crop material while the reciprocable knife 30 severs the crop material. The reel can be adjusted up and down and forward and back relative to the reciprocable knife 30. An auger 48 is rotatably mounted between the dividers 32 and behind the knife 30 to convey severed crop material to the center of the table 12 and into the elevator 14.

The elevator 14 includes an elevator housing and a chain and slot type conveyor. The elevator housing has a bottom 50, side walls 52 and 54 and a top 56. The chain and slat type conveyor includes chains 58, and slats 60 entrained around a drum 62 at the entrance end of the elevator 14. The drum 62 is rotatably supported on a pair of arms 64 for up and down movement relative to the bottom 50 of the elevator housing. The chain and slat conveyor is driven so as to receive crop material from the table 12 and to convey the material up and to the rear to the cylinder between the lower run of the chain and slat type conveyor and the bottom 50 of the elevator 14.

To prevent damage to the elevator 14 to the cylinder, and to the concave by rocks mixed with crop material, a door 66 is provided in the bottom 50 of the elevator housing. The door extends across the entire width of the elevator housing from the side wall 52 to the side wall 54. The door 66 is pivotally attached to the elevator housing by a hinge which extends along the entire width of the door 65. Preferably, the door is as far forward as it can be and still support all the crop material entering the elevator 14 to the cylinder.

The door 66 is opened by a latch 68 to allow rocks to fall to the ground. The latch is controlled by a rock detector 70 and a control circuit which operates the latch 68 to open the door 66 when the presence of a rock is detected by the detector 70. The detector 70, as best shown in FIG. 2, includes a piezoelectric ceramic disc 72 and a generally U-shaped mounting bracket 71 for attaching the piezoelectric ceramic disc 72 to the bottom 26 of the table 12.

Material conveyed along the bottom 26 of the table 12 by the auger 48 induces vibrations in the bottom 26 of the table and in the auger 48. These vibrations are picked up by the piezoelectric ceramic disc 72. The piezoelectric ceramic disc 72 produces an output voltage which varies in frequency and strength of amplitude depending upon the vibrations induced in the bottom 26 of the table 12 by the material conveyed by the auger 48.

The signal from the detector 70 is received by the band pass amplifier 74. The band pass amplifier filters out the voltage signals with a frequency below a predetermined value. It has been determined that the voltages induced by crop material have a relatively low frequency while those induced by rocks and other hard objects have a relatively high frequency. The signals produced by rocks and other hard foreign objects is passed on from the band pass amplifier 74 to a peak detector 76.

The peak detector 76 filters out all the voltage signals having an amplitude below a predetermined value. The signals which are passed on are those produced by relatively hard objects, such as rocks that are large enough to damage the elevator, cylinder, or concave.

The portion of the circuit including the resistors 78 and 80, the capacitor 82, and the semi-controlled rectifier 81 all of which is grounded at 86 receives the signal from the peak detector 76 and amplifies the signal. The amplified signal energizes the solenoid 88. The solenoid 88, which is part of the latch 68, releases the latching mechanism and allows the door 66 to fall open as indicated by the broken lines in FIG. 1. The rock or other hard object then falls through the opening in the bottom 50 of the elevator 14.

After the hard object has fallen through the opening in the bottom 50 of the elevator housing, the operator presses the reset switch 90 to de-energize the solenoid 88 by breaking the circuit with the power source 92 and closes the door 66. The door 66 is held in the closed position by the latch 68 until the solenoid 88 is energized by a signal from the detector 70.

If desired, an automatic closing means could be provided to close the door 66 automatically after a time delay or upon a signal from the operator. A horn or light may also be provided to indicate to the operator that the detector 70 has detected a rock or other hard object on the table bottom assembly 26.

I claim:

1. A rock trap for a combine harvester thresher characterized by a door in the path of feed of crop material, an electronic detection device capable of detecting the presence of rocks mixed with the crop material, and a latch capable of opening the door in response to a signal from the electronic rock detection circuit indicating the presence of one or more rocks mixed with crop material.

2. The rock trap of claim 1 characterized by said electronic rock detection device including a piezoelectric ceramic disc attached to the table bottom.

3. The rock trap of claim 2 characterized by the door extending across the bottom of the lower end of the elevator to the cylinder.

4. The rock trap of claim 2 characterized by the electronic rock detection device including a band pass amplifier, a peak detector, and a solenoid door release.

* * * * *